Nov. 18, 1958   W. R. ANDREWS   2,860,518
FRICTION DRIVEN STEPLESSLY VARIABLE GEARS
Filed June 3, 1957   3 Sheets-Sheet 1

Inventor
W. R. Andrews
By Glascock Downing Seebold
Attys.

Nov. 18, 1958 W. R. ANDREWS 2,860,518
FRICTION DRIVEN STEPLESSLY VARIABLE GEARS
Filed June 3, 1957 3 Sheets-Sheet 2

Inventor
W. R. Andrews
By Glascock Downing Diebold
Attys.

Nov. 18, 1958   W. R. ANDREWS   2,860,518
FRICTION DRIVEN STEPLESSLY VARIABLE GEARS
Filed June 3, 1957   3 Sheets-Sheet 3
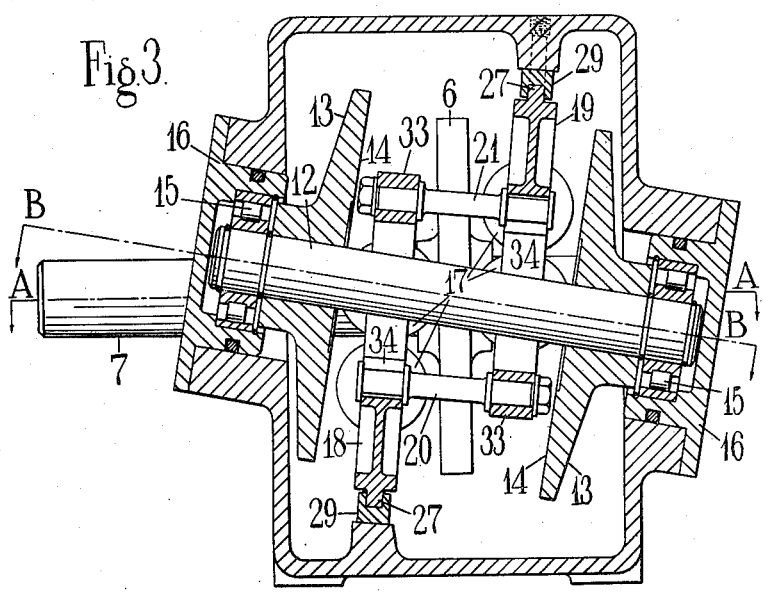
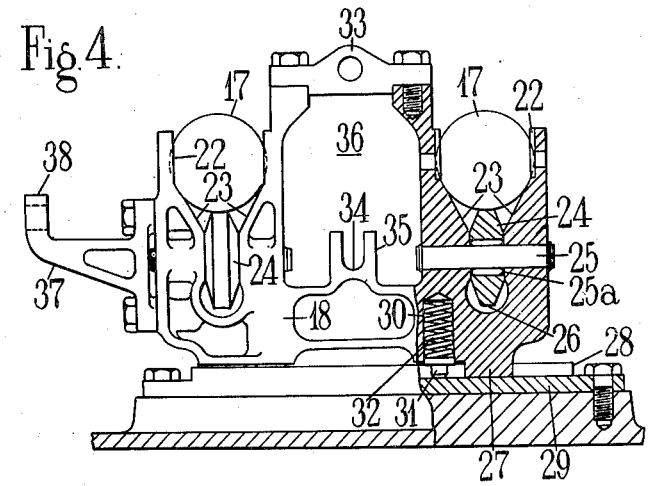
Inventor
W. R. Andrews

United States Patent Office

2,860,518
Patented Nov. 18, 1958

2,860,518

FRICTION DRIVEN STEPLESSLY VARIABLE GEARS

William Robinson Andrews, Burley-in-Wharfedale, England

Application June 3, 1957, Serial No. 663,185

Claims priority, application Great Britain June 19, 1956

14 Claims. (Cl. 74—200)

This invention relates to friction driven steplessly variable gearing of the type wherein a displaceable motion transmitting member of circular form, such as a ball or roller, is employed in conjunction with two overlapping friction discs constituting respectively driving and driven members, and the said motion transmitting member is displaceably mounted so that it can be moved closer to the axis of one of the discs and simultaneously further from the axis of the other disc in order to change the gear ratio.

In gearing of the above type as hitherto proposed it has been necessary to provide heavy thrust bearings for the disc shafts in order to resist the external reaction of the loads on the disc during drive transmission. The heavy bearings required for this purpose are a source of inefficiency in such gearing, and their use precludes the possibility of providing for limited longitudinal freedom of at least one of the disc shafts. It is an object of the present invention to provide an improved construction of gearing in which these disadvantages are avoided.

Another object is to provide gearing of the type described in which the motion transmitting members, e. g. the balls or rollers, are self-loading for both directions of rotation of the gearing.

The invention comprises a pair of friction discs mounted in spaced relation on a shaft, a second shaft carrying a friction disc located between the spaced discs in overlapping relation thereto and inclined with respect to the first shaft, a motion transmitting ball or roller member disposed in each of the V formations afforded by the relatively inclined discs to engage one of the spaced discs and one side of the disc on the second shaft, and means for adjustably displacing the ball or roller members simultaneously in a direction to vary their relative distances from the two shaft axes in order to change the gear ratio.

Preferably the shafts are parallel when viewed in one plane but lie at a small inclination to one another when viewed in a plane at right angles thereto. The relative inclination is preferably substantially equal to the minimum friction angle between the friction surfaces, i. e. the surfaces of the discs and the motion transmitting members, over the range of pressures encountered or under which the gearing is intended to operate.

According to a further feature of the invention the motion transmitting members are mounted so that they afford a degree of freedom in a plane which includes the centres of the three friction discs, i. e. in a direction into or out of the V formation afforded by the relatively inclined disc surfaces, and means is provided for spring loading the members into the said V formations. Preferably said loading means includes or is adapted to afford a stop means which limits movement of the member out of the V formation.

According to a further feature of the invention the motion transmitting members are mounted in a common support or carriage provided with open ended recesses shaped to constrain the said members laterally in their plane of adjustable displacement, said support or carriage being slidable in guides in the gear casing.

According to a further feature of the invention each motion transmitting member is supported by a rotatably mounted backing member, for example a roller and spring loading is applied to the motion transmitting member through said backing member.

In a preferred arrangement according to the invention there are provided two friction discs carried by parallel shafts, and the spaced discs are arranged between said shafts to overlap both the discs on the latter, there being provided two pairs of motion transmitting members each disposed between a disc on one of said parallel shafts and one of the spaced discs.

According to a further feature of the invention, the motion transmitting members are constituted by rollers or discs having peripheries of spherical form, each of said rollers or discs is mounted so that it can rock or swivel about an axis more or less bisecting the V or angle between the relatively tilted discs so that contact with the adjacent surfaces takes place on different tracks as the gear ratio is changed.

According to a further feature of the invention the position of the motion transmitting members relative to the axes of the driving and driven disc shafts is adjusted so that the respective lines of contact with the relatively inclined disc surfaces lie substantially at equal distances on one or other side of the centres of the discs with which each member is in contact.

In the accompanying drawings,

Figure 3 is a vertical section on the line C—C of Figure 1;

Figure 4 is an elevation, shown partly in section, of one of the elements of the ball carriage.

Figure 1:
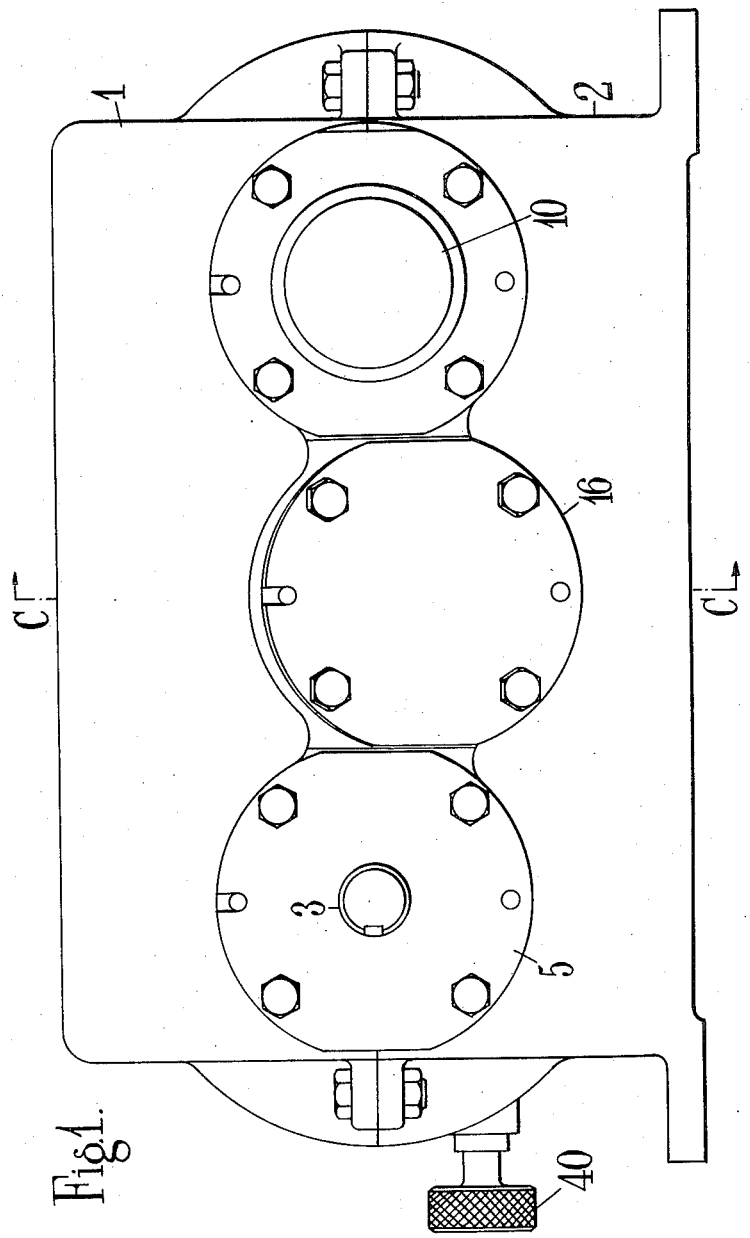
Figure 1 is a side elevation of a friction gear box constructed in accordance with the invention.
Figure 2:
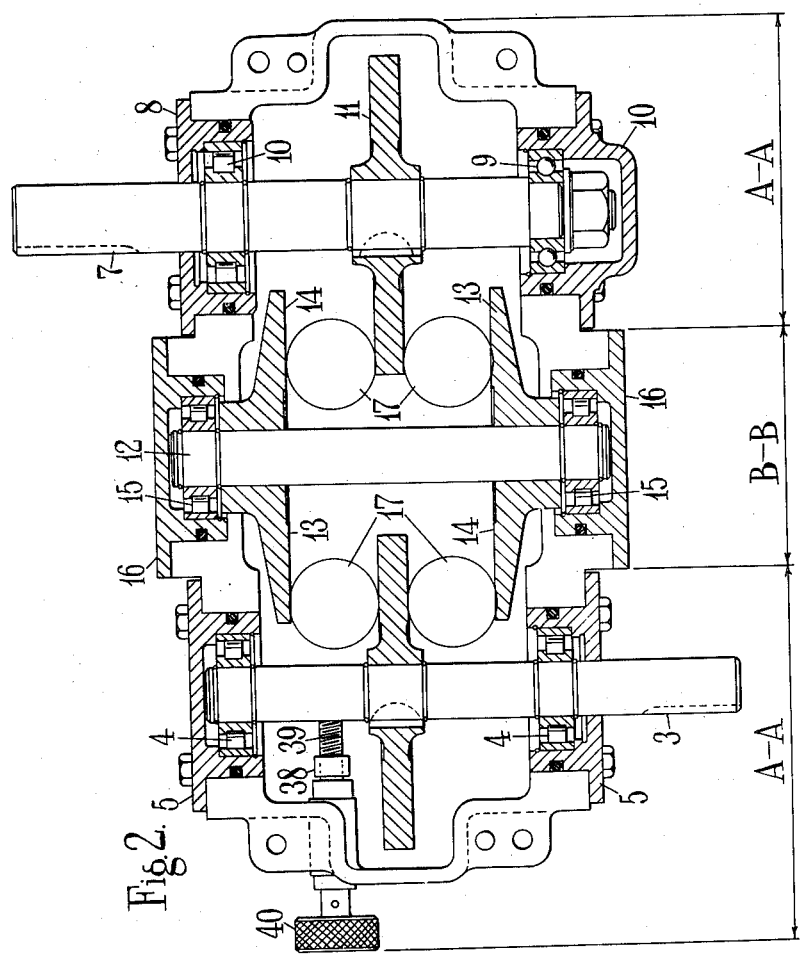
Figure 2 is a plan view of the lower part of the box of Figure 1, the ball carriage being omitted and the section marked B—B being shown for convenience as lying in the same plane as the sections marked A—A.

In carrying the invention into effect according to one convenient mode as illustrated in the figures there is provided a horizontally split casing comprising an upper part 1 and a lower part 2 which parts are bolted together in a conventional manner. An input or primary shaft 3 is rotatably mounted in roller bearings 4 which are carried in removably mounted housings 5. A friction disc 6 having suitable friction surfaces on both sides thereof is keyed to the shaft 3. An output or secondary shaft 7 is rotatably mounted in a roller bearing 8 and in a ball thrust bearing 9, these bearings being carried in removably mounted housings 10. The shafts 3 and 7 are parallel and lie in the same plane. A disc 11, similar to the disc 6 is keyed to the shaft 7 and lies in the same plane as the disc 6. A shaft 12 lying between the shafts 3 and 7 has secured to the ends thereof a pair of friction discs 13 having inwardly facing friction surfaces 14. This shaft will be referred to as the bobbin shaft. For convenience the bobbin shaft is shown in Figure 2 as lying in the same plane as the shafts 3 and 7, but in fact it is tilted relatively thereto as is clearly seen in Figure 3, the angle of tilt being preferably substantially equal to the minimum friction angle between the friction surfaces over the range of pressures encountered. The shaft 12 is rotatably mounted in roller bearings 15 so that it is afforded limited longitudinal movement. These bearings 15 are carried by removably mounted housings 16. The discs 6 and 11 lie between and overlap the bobbin discs 13, and two pairs of friction balls 17 are mounted in a manner hereinafter to be described, so that one of the balls can be engaged between each side of the discs 6 and 11 and one of the overlapping faces of the bobbin discs 13. The balls are mounted in a carriage under spring loading so that each ball is resiliently pressed into the V formation afforded by the relatively inclined discs 6 or 11 and 13, and the carriage is adjustably slidable in guides so that the position of each ball pair relative to the bobbin shaft 12 can be relatively varied for changing the gear ratio.

Referring to Figures 3 and 4, the ball carriage comprises a pair of spaced frames 18 and 19 connected by bolts 20 and 21. Each frame is formed with a pair of ball receiving recesses 22 having an inner V shaped part 23 in which is rotatably mounted a backing roller 24 on a fixed pin 25 by means of a needle bearing 25a. The edge 26 of each backing roller 24 is shaped to fit the curvature of the ball 17. The outer edge of each of the frames 18, 19 is formed with a pair of guide projections 27 which are engaged in straight slots 28 in a guide member 29 secured to the gear casing. Each of the frames 18, 19 has a pair of bores 30 containing a slidable plunger 31 loaded by a spring 32, the outer end of the plunger being engaged in the slot 28 of the guide member 29. These spring loaded plungers tend to press the frame outwardly from the guide so that each pair of balls is forced into the V between the relatively inclined discs 6 or 11 and 13. Also movement of the frame into the guide is limited and thus there is afforded a stop means which limits the movement of the ball out of the V formation. To permit the required relative movement between the frames, each of the connecting bolts 20, 21 is mounted in a cap 33 secured to the frame and its other end is slidably located and guided in a slot 34 in a U-shaped projection 35 which lies in an opening 36 in the frame. A bracket 37 secured to one end of the lower frame 18 (Figure 4) is formed with a nut 38 in which is engaged a screw 39 rotatably mounted in the gear casing and operable by a knurled head 40 outside the casing as shown in Figure 2. By rotating the head 40 the carriage can be displaced in either direction in its guides for varying the gear ratio.

The arrangement is such that when the gear is rotating the torque reaction on the two balls engaged with the disc 6 forces one of them in a direction out of the V, such movement being limited by the stop means previously described, and forces the other ball into the V between the discs so as to produce a sideways pressure which is proportional to the applied torque and which is also imparted to the first said ball by reason of the permitted longitudinal movement of the shaft 12 carrying the spaced discs, and is of sufficient magnitude to transmit the power required. Similar considerations apply to the two balls engaged with the disc 11 on the output shaft 7. Thus one ball of each pair is self-loading into the V and this action loads both balls with their respective V's to enable them to transmit the power. If the direction of drive is reversed, the balls which were previously transmitting the drive will tend to be forced out of the V and the other ball of each pair will supply the sideways pressure by being forced into the V as previously described. Thus provision is made for self-loading of the drive transmitting balls for both directions of rotation. It is also to be noted that the output shaft 7 is held against longitudinal movement and can therefore resist any externally imposed end load which might be caused for example by worm or helical gearing driven by said shaft. The shafts 3 and 12 are however afforded a small degree of longitudinal freedom to accommodate possible deflections of parts of the gearing under load and to allow for the movement of the balls when transmitting torque.

The invention is not restricted to the above example. Thus there may be only two shafts similar to shafts 3 and 12, either of which may constitute the input shaft. In an alternative arrangement there are provided two shafts each having a pair of discs in fixed spaced relation, i. e. a bobbin shaft, one disc being arranged between and in overlapping relation with the spaced discs of the other shaft, and three motion transmitting members such as balls are disposed each in one of the three spaces between the overlapping discs. It will be understood that the two shafts are parallel in one plane and are relatively tilted in a plane at right angles thereto, and the drive transmitting members are loaded as previously described.

In another alternative arrangement both input and output shafts are bobbin shafts having spaced discs and disposed in parallel relation. A third shaft having a single disc thereon is arranged between the bobbin shafts so that its disc overlaps the two pairs of spaced discs and is tilted relatively to the latter in one plane. Four motion transmitting members such as balls are disposed two on either side of the single disc and each engaging the single disc and the inner face of one of the bobbin discs on both the driving and driven shafts. The four motion transmitting members may be mounted in a common support or carriage as previously described, or alternatively each pair of members may be independently mounted.

The backing means for the motion transmitting balls may comprise an angular contact ball bearing arrangement instead of the rotatable rollers previously described. Also rollers, preferably having spherically formed peripheries, may be employed instead of balls. With such an arrangement there may be provided means for rocking the rollers about their axes so that their contact with the disc friction surfaces takes place on different tracks as the gear ratio is changed.

Where the motion transmitting members are constituted by rollers or discs having peripheries of spherical form, each of said rollers or discs is preferably mounted so that it can rock or swivel about an axis more or less bisecting the V or angle between the relatively tilted discs so that contact with the adjacent surfaces takes place on different tracks as the gear ratio is changed. This is effected by mounting the roller in a fork or like carrier having a stem lying at right angles to the roller axis and mounted for pivotal movement in the carriage. In other words the roller is mounted somewhat in the manner of a castor.

In all the arrangements according to the invention it is preferred that the position of the motion transmitting members, e. g. balls or rollers, relative to the axes of the driving and driven shafts is adjusted so that the respective lines of contact with the relatively inclined disc surfaces lie substantially at equal distances on one or other side of the centres of the discs with which each member is in contact.

I claim:

1. Variable gearing of the type described comprising a pair of friction discs mounted in rigidly spaced relation on a shaft, a second shaft carrying a friction disc located between the spaced discs in overlapping relation thereto and inclined with respect to the first shaft, a motion transmitting ball or roller member disposed in each of the V formations afforded by the relatively inclined discs to engage one of said spaced discs and one side of the disc on the second shaft, mounting means for said motion transmitting members affording them a degree of freedom in a direction in and out of the V formation in a plane which includes the centres of the three friction discs, means for spring loading the said members into the V formations, means for limiting movement of said members out of the V formation, and means for adjustably displacing the said members simultaneously in a direction to vary their relative distances from the two shaft axes in order to change the gear ratio.

2. Variable gearing according to claim 1, in which the shafts are mounted so that they are parallel in one plane and have a small relative inclination in a plane at right angles to said first plane.

3. Variable gearing according to claim 1 in which the inclination between the discs is substantially equal to the minimum friction angle between the friction surfaces.

4. Variable gearing according to claim 1 in which the shaft carrying the spaced discs is afforded limited longitudinal movement.

5. Variable gearing according to claim 1 in which the mounting means for the motion transmitting members includes stop means for limiting movement of the member out of the V formation.

6. Variable gearing according to claim 1 having a gear casing, in which the mounting means for the motion transmitting members includes a common support carriage having open ended recesses shaped to constrain said members laterally in their plane of adjustable displacement, and guides in said gear casing in which the support carriage is slidable.

7. Variable gearing according to claim 1, in which each motion transmitting member is supported by a rotatably mounted backing member through which the spring loading is applied.

8. Variable gearing according to claim 1 in which each motion transmitting member is a ball which is supported by a roller having supporting bearings.

9. Variable gearing according to claim 1 comprising a third shaft carrying a friction disc located between the rigidly spaced discs in overlapping relation thereto, the said second and third shafts being parallel, and there being provided two pairs of motion transmitting members each disposed between a disc on one of said parallel shafts and one of the rigidly spaced discs.

10. Variable gearing according to claim 1 having a gear casing, in which the mounting means for the motion transmitting members includes a common support carriage, and comprising guides in said gear casing in which the support carriage is slidable, and spring loading between the support carriage and said guides.

11. Variable gearing according to claim 1 having a gear casing, in which the mounting means for the motion transmitting members includes a common support carriage, and comprising guides in said gear casing in which the support carriage is slidable, and spring loading between the support carriage and said guides, said support carriage comprising elements mounted for limited relative movement in parallel planes.

12. Variable gearing according to claim 1 having a gear casing, in which the mounting means for the motion transmitting members includes a common support carriage, said carriage comprising a pair of frames each having laterally spaced recesses for the motion transmitting members, means connecting said frames in parallel relation comprising bolts secured to one frame and having a slidable guide connection with the other frame to afford relative movement between the frames, there being provided slide guides in opposite sides of the gear casing and the opposite ends of said frames resting in said guides.

13. Variable gearing according to claim 1, in which one of the disc carrying shafts is provided with a thrust bearing to prevent longitudinal motion thereof the other disc carrying shafts being supported in bearings permitting limited longitudinal motion of the shaft.

14. Variable gearing according to claim 1, in which the disc carrying shaft constituting the output shaft is provided with a thrust bearing preventing longitudinal motion thereof, the other disc carrying shafts being supported in bearings permitting limited longitudinal motion of the shaft.

References Cited in the file of this patent

UNITED STATES PATENTS

| | | |
|---|---|---|
| 1,317,916 | Ford | Oct. 7, 1919 |
| 1,803,834 | Bates | May 5, 1931 |
| 2,209,254 | Ahnger | July 23, 1940 |
| 2,512,717 | Dicke | June 27, 1950 |

FOREIGN PATENTS

| | | |
|---|---|---|
| 630,550 | France | Aug. 23, 1927 |